United States Patent Office 2,718,168
Patented Sept. 20, 1955

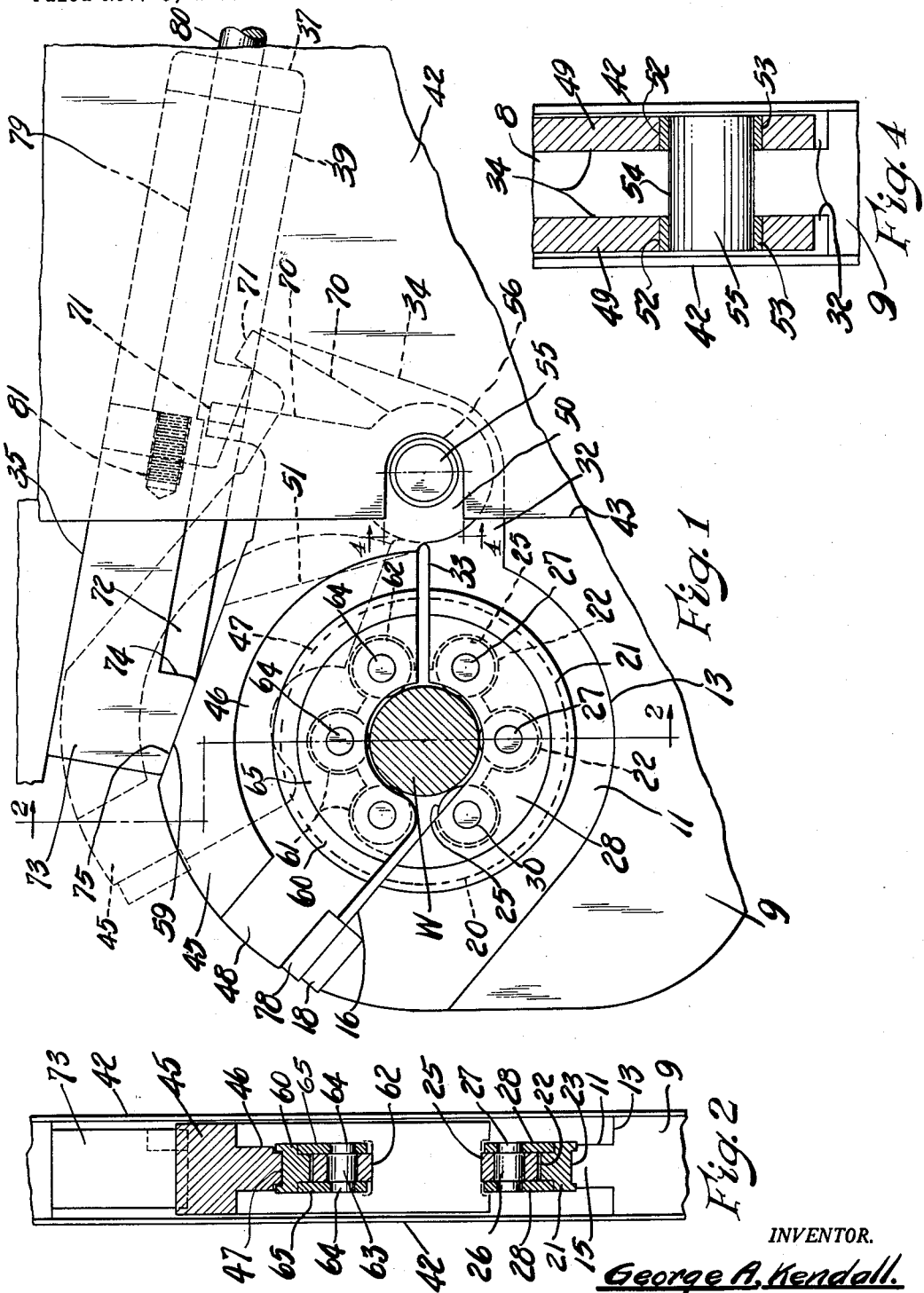

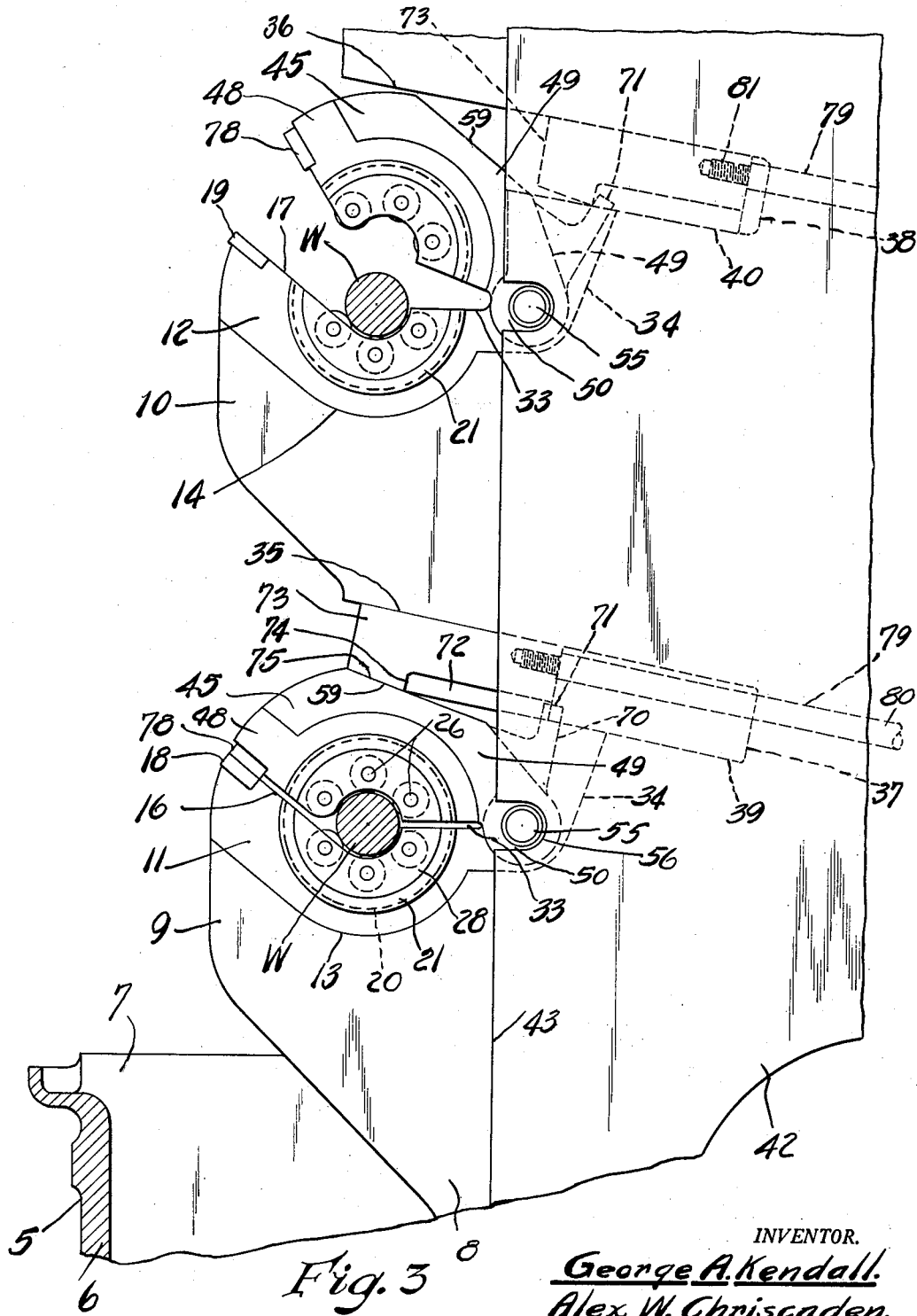

2,718,168

HYDRAULICALLY ACTUATED STEADY RESTS

George A. Kendall and Alex W. Chriscaden, Saginaw, Mich., assignors to Wickes Bros., a Division of The Wickes Corporation, Saginaw, Mich.

Application November 3, 1950, Serial No. 193,956

4 Claims. (Cl. 82—39)

The present invention relates to crankshaft lathes, and more particularly to a steady rest therefor.

One object of the invention is to provide a steady rest having semi-circular work engaging members, one of which is adapted to be moved into and out of its work engaging position by means of a pressure fluid actuator.

Another object is to provide a steady rest having a pair of semi-circular members provided with work engaging rollers to anti-frictionally support the workpiece, and to provide a wedge actuator for holding the semi-circular members in their operative position.

Another object is to provide a steady rest, including a pair of semi-circular work supporting members one of which is movable toward and away from the other and is provided with an oblique surface adapted to be engaged by an oblique surface on an actuator to provide mutually engaging cam surfaces for holding the movable member in its work supporting position.

Another object is to provide a steady rest including fixed and movable work supporting members with means on the movable work supporting member engageable with the wedge actuator during its retracted movement to swing the movable steady rest jaw to an inoperative position for permitting insertion and removal of workpieces such as crankshafts and the like.

Another object is to provide a steady rest for crank shaft and other lathes which will support the work between the lathe spindles and will prevent the same from being lifted during the turning operation and the formation of chatter marks on the turned surfaces.

Another object is to provide a steady rest for crankshaft lathes of the double and multiple spindle types in which the spindles are arranged in pairs one above the other and the steady rests are positioned such that they may be alternately operated to facilitate the removal and replacement of one workpiece between a certain pair of spindles, while the workpiece between the other pair of spindles is being turned.

Another object is to provide a steady rest having fixed and movable work supporting members which are adapted to be held in a closed work engaging position by a sliding wedge member which will hold the members in tight engagement one with the other in such a manner that the work will be supported against lateral movement during the turning operation.

Another object is to provide a steady rest having fixed and movable work supporting members provided with work engaging anti-friction rollers, and to provide hydraulically operated means for locking the movable member in an operative work supporting position during movement of the hydraulically operated actuator in one direction and to rock the movable member out of its operative position to an inoperative position when the hydraulically operated actuator is moved in the opposite direction.

Another object is to provide a steady rest including a fixed and movable work supporting member in which the movable member is arranged to rock to and fro into work engaging and supporting position, and is limited in its movement by hardened metal contacting surfaces carried by the fixed and movable members and located adjacent their free ends.

Other objects and advantages of the invention will become apparent during the course of the following description of the accompanying drawings, wherein:

Figure 1 is a vertical transverse sectional view of a double spindle lathe illustrating the steady rest, and showing the movable work supporting member in its closed position when the wedge actuator is moved in a forward direction. The dotted line position of the actuator illustrates the manner in which the movable steady rest jaw member is moved to its open or inoperative position.

Figure 2 is a vertical cross-sectional view taken upon the irregular line 2—2 of Figure 1 and looking in the direction of the arrows to illustrate various structural details of the fixed and movable work supporting members, including the reciprocable wedge block actuator and the manner in which the same engages the upper movable steady rest member.

Figure 3 is a fragmentary vertical cross-sectional view taken transversely through a double spindle lathe and illustrating the steady rests in their corresponding positions between the upper and lower sets of spindles and arranged along the axis for supporting various workpieces of round section. The lower steady rest is illustrated in its closed or operative position, while the steady rest for the upper pair of spindles is shown in its open inoperative position to facilitate the insertion and removal of various workpieces such as crankshafts and the like having a round section, and Figure 4 is a vertical cross-sectional view taken on the offset line 4—4 (Figure 1) and looking in the direction of the arrows to illustrate the pivot pin and the divided arms on the movable steady rest member for rockably supporting the same.

In the drawings, and more in detail, there is shown for the purpose of convenience of illustration a double spindle lathe generally designated 5 (Figure 3) which includes a bed frame 6 as usual providing a chip trough 7 located beneath the working area of the lathe. The bed end of the lathe is not shown, but it is pointed out that suitable chucking devices and spindles are provided at each end of the lathe for supporting the ends of the workpiece as used in connection with present day crankshaft lathes.

Supported on the bed frame 5 and positioned intermediate the spindles of the lathe is a division plate 8 which has its rear and lower edges secured to the frame of the lathe (not shown) so that the division plate 8 will extend vertically. The division plate 8 is formed with projections 9 and 10 which project beneath the axis of each of the lathe spindles, and as illustrated in Figures 2 and 4 the division plate is of considerable thickness to increase its damping characteristics. The lathe spindles are arranged to support workpieces W (Figure 3) and are centered with respect to the workpieces in the conventional manner.

The projections 9 and 10 are machined to provide areas 11 and 12 of reduced thickness, and as illustrated in Figures 1 to 3 the projections 9 and 10 are cut along curved lines 13 and 14 respectively on opposite sides of the division plate to provide a seating rib 15 (Figure 2). The seating rib is provided with a relatively straight portion 16 which extends obliquely upward and forward to the outer end of the projection 9. Similarly, the projection 10 is cut along its corresponding rib to provide an oblique forwardly and upwardly projecting portion 17. Metal inserts 18 and 19 are mounted on the forwardmost portions of the seating ribs 16 and 17 and are formed of relatively hard metal for a purpose which will be hereinafter more fully described.

The projections 9 and 10 are cut away on opposite sides as at 11 and 12 in substantially the same manner, and since the steady rest work supporting structures are identical for each steady rest a description of one will suffice for both. As illustrated in Figures 1 and 3 the projections 9 and 10 are provided with a series of work supporting rollers, and said rollers are arranged to engage the workpiece W as circumferentially spaced apart locations. Each of the projections 9 and 10 is cut to provide a circular opening on the dotted line 20 (Figure 1) which forms a curved seating portion for an arcuate roller supporting frame section 21 (Figure 2). The arcuate roller supporting frame is provided with a series of round openings 22 and the side wall portions of the arcuate frame 21 are cut away as illustrated in Figure 2. The lower portion is slightly grooved as at 23 to seat upon a correspondingly shaped portion of the seating rib 15. Screws or other fastening elements (not shown) may be provided for securing the lower arcuate supporting frames 21 on their corresponding seating ribs 15. The round cut away portions 22 of the roller supporting frame 21 are slightly greater in diameter than the work engaging rollers 25 to permit free rotation of said rollers and each of the rollers is mounted on a supporting pin 26 having end portions 27 of slightly reduced diameter (Figure 2). A pair of side plates 28 are arranged on opposite sides of the supporting frames 21 and said side plates are provided with openings 30 for receiving the reduced end portions of the pins 26. Thus, the rollers 25 are sandwiched between the side plates 28 and threaded fastening elements or the like may be provided for securing the side plates 28 to the roller supporting frame 21.

The division plate 8 is cut away on opposite sides thereof as at 32 from the area 11 upwardly to a horizontal edge 33 and rearwardly as indicated at 34 (Figure 1) and the division plate 8 is cut inwardly between the projections 9 and 10 as at 35 to provide an oblique surface. Similarly, the division plate above the projection 10 is cut away to form an oblique surface 36. The oblique surfaces 35 and 36 extend rearwardly and terminate in inclined walls 37 and 38 and the division plate 8 is further cut away as at 39 and 40 by inclined walls which extend from the inclined walls 37 and 38 forwardly a slight distance beyond the reduced portions 34. A pair of side plates 42 are secured to opposite sides of the division plate 8 and are secured thereto by suitable fastening means (not shown). The side plates 42 with the cut away portions of the division plate 8 as at 35—36, 37—38 and 39—40 provide inwardly inclined chambers, one arranged above each of the projections 9 and 10. The inclined lower walls 39 and 40 of each of the chambers thus formed extend to the forward edge 43 of the side or wear plates 42 and thus, a space is formed between the horizontal edges 33 of the projections 9 and 10 and the inclined wall surfaces 35 and 36 on the division plate 8. It is noted that the inclined wall surface 35 is formed on the lower portion of the projection 10. The inclined surface 36 is formed on the division plate by cutting the same away adjacent the upper end of the plate (not shown).

Rockably mounted and cooperating with each of the work supporting projections 9 and 10 is a casting 45 which is arcuately shaped to provide a movable steady rest member which is cut away on both sides as at 46 and is provided with a curved inner surface 47 (Figure 1) complementary with the curved surface 20 in the projections 9 and 10. The arcuate member 45 has its front portion cut away on opposite sides as at 48 to reduce the thickness of the movable steady rest member and the rear portion of the arcuate steady rest member 45 is provided with a pair of spaced arms 49 which terminate in bearing portions 50. The casting 45 is cut inwardly from the spaced bearing portions 50 to a point indicated in Figure 1 at 51, and said arms 49 are arranged to straddle the forward edge of the division plate 8 at the point where the thickness has been reduced by machining the opposite sides thereof as at 34 previously explained. Each of the bearing arms 49 is thus arranged for free movement on opposite sides of said reduced portion. The bearing end portions 50 are provided with openings 52 for receiving bearings 53, and similarly, the division plate 8 is provided with a transverse bore 54 for receiving a pin 55. Portions of the wear plates 42 are cut away as at 56 to permit insertion and removal of the pins 55. Thus, the arcuate casting 45 may rock to and fro on the pivot pin 55 to permit the movable steady rest jaw member to move into and out of its work supporting position. The arcuate steady rest member 45 is provided on its peripheral surface with a flattened portion 59, and it is to be noted that the flattened portions 59 are shaped to extend obliquely to the inclined wall surfaces 35 and 36 when the movable steady rest jaw 45 is in its closed position.

Each steady rest jaw 45 is provided with a roller supporting frame 60 similar to the roller supporting frame 21, and said frame is cut away on both sides and is formed with round internal openings 61 for accommodating a plurality of circumferentially spaced work engaging rollers 62. The rollers 62 are mounted on pins 63 having reduced end portions 64 which are received in openings of a corresponding diameter in side supporting plates 65. The supporting plates 65 can be secured to the roller supporting frame 60 by threaded fasteners, and similarly, the frame 60 can be secured to the arcuate movable steady rest member 45 by threaded fasteners or the like.

It is to be noted that the rollers 62 are arranged opposite the rollers 25 in diametral pairs so that when the work W such as a crankshaft or the like is supported therebetween it may rotate freely, but yet be prevented from lifting or lateral movement which results in chatter marks on the portions of the workpiece being turned.

Formed on each of the movable steady rest members 45 at the rear end thereof is a projection 70 which has an end portion 71 which is adapted to project into the chamber formed between the upper and lower inclined walls 35—37 and 36—38. The projection 71 projects into a longitudinally cut away portion 72 in a reciprocating actuator block 73 which is slidably arranged in the chamber and is guided between the walls 35—39 and 36—40 and is held against displacement by the wear plates 42 on opposite sides of the division plate 8. At one end of the longitudinally cut away portion 72 is a shoulder 74 which is adapted to engage the projection 71 when the wedge block 73 is moved in the direction shown in Figure 3 in the upper portion of the drawing. Also formed on the forward end of the wedge block 73 is an inclined wedge surface 75 which is adapted to cooperate with the wedge surface 59 on the arcuate movable steady rest member to lock the same in a closed position when the wedge block 73 is in its forward position as shown in Figure 1. Hardened metal inserts 78 are mounted in the free swinging end of the movable steady rest member 45 which is adapted to engage the hard metal inserts 18—19 in the respective projections 9 and 10.

Formed in the division plate 8 is a bore 79 in which is reciprocably mounted an actuator shaft 80 which has one end connected to the piston of a pressure fluid cylinder (not shown), while its other end is threadedly connected to the wedge block 73 by having its threaded end received in a correspondingly threaded bore 81 extending inwardly from the rear edge or end of said wedge block 73. Suitable control means is provided for supplying pressure fluid to the opposite ends of the actuating cylinder for the control rod 80 to admit pressure fluid to either end thereof from a suitable source or pressure supply. Thus, when pressure fluid is admitted to the rear end of the cylinder the wedge block 73 will be retracted so that the cooperating and mutually engaging wedge surfaces 59 and 75 will release the movable steady rest members 45, and after being released the shoulder 74 will engage the projection 71 and rock the movable steady rest member about the pivot pin 55 to its open position as shown in dotted lines in Figure 1 and in full lines in the upper portion of Figure 3.

When pressure fluid is admitted to the rear end of the control cylinder (not shown), the piston will urge the rod 80 forward so as to move the wedge block 73 in a corresponding direction and cause the wedge surfaces 59 and 75 to urge the movable steady rest member 45 into tight work engaging position which is limited by the stops 18—19 and 78. Thus, the mutually engaging wedge surfaces 59 and 75 will lock the movable steady rest member 45 in its work engaging position so that the rollers of the lower supporting portions 25 and the rollers 62 carried by the movable steady rest members will contactually engage the work W with the same pressure for each workpiece.

A description of the control cylinder or pressure fluid device is believed to be unnecessary in view of the fact that such devices are comon and well know in hydraulic control devices.

While the invention has been described for use in connection with a double spindle crankshaft lathe, it will be readily understood, that the steady rest can be applied to other types of lathes in which the workpiece is of considerable length and lifting or flexing thereof is encountered when the workpiece is operated on by the turning tools. Also, it is to be understood that the device is positioned so that the work supporting members will engage a central bearing portion of the crankshaft being turned, and that the steady rest can be adapted for multiple spindle lathes having a plurality of sets of spindles by simply increasing the number of projections 9 and 10 and cooperating movable work rest members 45.

We claim:

1. In a steady rest for lathes, a vertical support mounted between the lathe spindles, said support having an arcuate cut-away portion forming a fixed work-receiving jaw in the front edge thereof, a movable work-supporting jaw pivoted rearwardly of said fixed jaw on said vertical support and swingable forwardly to engage said fixed jaw and clamp said work, said movable jaw being formed with a flatted, outwardly and outwardly inclined upper surface which extends upwardly and forwardly when the movable jaw is in work clamping position, said surface having a projection thereon extending upwardly when the movable jaw is in said work clamping position, said vertical support having a downwardly inclined, transversely disposed opening therein leading from above said movable jaw, an actuator in said opening slidable between said vertical support member and said movable jaw, said actuator being formed with a downwardly projecting shoulder on the front end thereof to engage the projection on said movable jaw to swing the movable jaw upwardly and release the work when said actuator is moved rearwardly, said shoulder having an upwardly and outwardly inclined lower surface to wedge between the inclined, flatted surface of said movable jaw and the marginal inclined surface of said vertical support member adjacent said transverse opening when said actuator is moved forwardly to securely lock the jaws around the work, and hydraulic pressure means for moving said actuator forwardly and rearwardly.

2. In a steady rest for lathes, a support mounted between the spindles of the lathe, a work receiving jaw member provided on said support member, a movable work clamping jaw member rockably mounted on said support to swing toward and way from said work receiving jaw to work clamping and open positions respectively, an actuator slide mounted between said support and movable jaw member and engaging said movable jaw member when moved in one direction to move it toward said fixed jaw member into work clamping position, means for moving said slide to and fro, mutually inclined wedge surfaces on said slide and movable jaw member to lock said actuator slide in wedged position and said movable jaw member in clamping position, and means on said slide engaging said movable jaw member when said slide is moved in the opposite direction to swing said movable jaw away from said fixed jaw member.

3. The combination defined in claim 2 in which a projection is provided on said movable jaw member and said means on the slide includes a shoulder for engagement therewith, the one surface of the shoulder being inclined to provide a wedging surface.

4. In a steady rest for lathes, a fixed work receiving jaw member supported between the spindles of the lathe, a movable work engaging jaw member rockably mounted thereon to swing toward and away from said work receiving jaw to work clamping and open positions respectively, an actuator slide carried by said fixed jaw member and engaging said movable jaw member when moved in one direction to move it toward said fixed jaw member into work engaging position, means for moving said actuator slide in said direction and for retracting the same, inclined wedge surfaces on said actuator slide and movable jaw member and mutually engaging surfaces on said slide and fixed jaw member to lock said actuator slide in wedged position between said fixed jaw member and movable jaw when the movable jaw is moved to clamping position, and means on said slide engaging said movable jaw member when said slide is retracted to swing said movable jaw away from said fixed jaw member.

References Cited in the file of this patent

UNITED STATES PATENTS

| | | |
|---|---|---|
| 1,906,577 | Groene | May 2, 1933 |
| 1,961,091 | Smith et al. | May 29, 1934 |
| 2,085,357 | Groene | June 29, 1937 |
| 2,348,426 | Sparrow | May 9, 1944 |